United States Patent [19]
Ikedo et al.

[11] Patent Number: 5,226,025
[45] Date of Patent: Jul. 6, 1993

[54] MAGAZINE DISK PLAYER HAVING AN IMPROVED MAGAZINE DETECTING FEATURE

[75] Inventors: Yuji Ikedo; Takahiro Okajima; Ken Okamura, all of Saitama, Japan

[73] Assignee: Pioneer Electronic Corporation, Tokyo, Japan

[21] Appl. No.: 713,229

[22] Filed: Jun. 11, 1991

[30] Foreign Application Priority Data

Dec. 19, 1990 [JP] Japan ............................ 2-403534

[51] Int. Cl.$^5$ .................. G11B 17/03; G11B 17/22; G11B 19/12
[52] U.S. Cl. .................................. 369/36; 369/34; 369/127
[58] Field of Search .............. 369/34, 36, 38, 39, 369/77.1, 77.2, 127, 128

[56] References Cited

U.S. PATENT DOCUMENTS

| | | | |
|---|---|---|---|
| 4,730,291 | 3/1988 | Ikedo et al. | 369/39 X |
| 4,772,965 | 9/1988 | Kato et al. | 360/71 |
| 4,841,499 | 6/1989 | Takahashi et al. | 369/36 X |
| 4,864,551 | 9/1989 | Tomita et al. | 369/36 |
| 5,014,258 | 5/1991 | Takemasa et al. | 369/36 X |

FOREIGN PATENT DOCUMENTS

| | | |
|---|---|---|
| 0240926 | 4/1987 | European Pat. Off. |
| 0284815 | 10/1988 | European Pat. Off. |
| 0293150 | 11/1988 | European Pat. Off. |
| 0391465 | 10/1990 | European Pat. Off. |
| 4009260 | 11/1990 | Fed. Rep. of Germany . |
| 2610131 | 3/1988 | France . |

Primary Examiner—Eugene R. LaRoche
Assistant Examiner—Michael C. Kessell
Attorney, Agent, or Firm—Sughrue, Mion, Zinn, Macpeak & Seas

[57] ABSTRACT

A magazine disk player for accommodating either a plurality of disks or a single disk. The disk player includes a magazine loading section for holding a magazine, disk conveyor for supplying a disk from the magazine to the turn table, and returning the disk thereinto, a magazine loading detecting device for detecting the loading of the magazine, an operating member which is movable between a first position and a second position, and which, when the magazine is loaded into the magazine loading section, is moved from the first position to the second position being engaged with the magazine, a locking member provided near the magazine loading section in such a manner that the locking member is movable between a locking position and a non-locking position, and which is engaged with the magazine to lock the latter to the magazine loading section being urged towards the locking position wherein the magazine loading detector detects the position of the locking member. In the player, the operating member is maintained engaged with the locking member to inhibit the movement of the locking member while being moved from the first position to the second position, and the inhibition of the movement of the locking member is eliminated when the operating member reaches the second position.

10 Claims, 8 Drawing Sheets

PRIOR ART

FIG. 19

PRIOR ART

FIG. 20

PRIOR ART

FIG. 21

MAGAZINE DISK PLAYER HAVING AN IMPROVED MAGAZINE DETECTING FEATURE

BACKGROUND OF THE INVENTION

This invention relates to a disk player, and more particularly to a "magazine disk player" in which a plurality of disks are loaded, and a desired one of the disks is selected so that the disks are played one after another.

A conventional magazine disk player comprises a disk playing means including a turn table and a pickup for playing a disk, a magazine loading section adapted to detachably hold a magazine containing a plurality of disks which are arranged in its housing and can be inserted into and taken out of the housing through an opening formed therein one at a time and a disk conveying means which, in response to a disk playing instruction, takes the disk out of the magazine which is to be played, and conveys the disk thus taken out onto the turn table, and which returns the disk into the magazine. The disk player further comprises a magazine loading detecting means which, in order to allow the disk conveying means to positively convey the disk, detects whether or not the magazine has been positively loaded in the magazine loading section. In addition, the magazine disk player includes magazine ejecting means for removing the magazine from the player housing for instance when the disk is to be replaced. The magazine ejecting means includes a push-out lever which is provided near the deepest region of the magazine loading section in such a manner that it is pivotable, and which is engaged through its free end portion with the magazine, to push the latter out of the magazine loading section and a pushing force applying means for applying a pushing force, or a biasing force, to the push-out lever.

With the magazine disk player thus constructed, in the case where a desired disk is to be played, the following two methods are employed. In the first method, the magazine in the magazine loading section is replaced with the magazine which contains the desired disk. In the second method, the magazine is removed from the magazine loading section, and any one of the disks in the magazine thus removed is replaced with the desired disk, and then the magazine is loaded into the magazine loading section again. In the case where it is required to play disks kept by the operator, the above-described operations must be carried out for each disk, which are rather troublesome.

In order to overcome this difficulty, a magazine disk player has been proposed in the art in which the disks can be replaced quickly and readily, as described in Japanese Kokai No. 261851/1986. The magazine disk player is designed to use a single adapter. The single adapter has the same outside dimension as the aforementioned magazine, and is loaded in the magazine loading section. With the single adapter thus loaded, insertion or replacement of one disk is carried out.

In order to use the above-described single adapter, it is necessary to control the operation of the disk conveying means separately according to whether the magazine has been loaded or whether the single adapter has been loaded. For this purpose, the magazine loading detecting means is so designed as to detect whether the magazine is loaded or whether the single adapter is loaded. More specifically, the magazine loading detecting means includes a pair of detecting levers which are freely pivotable and have free end portions, respectively, which are engageable with the magazine, biasing force applying means, namely, coil springs for applying biasing forces to the detecting levers respectively and a pair of detecting switches which are engaged with the detecting levers, respectively. That is, the magazine disk player is so designed that, when the magazine is loaded, the magazine is engaged with both of the detecting levers to swing them against the elastic forces of the coil springs, so that the detecting switches output detection signals, respectively and when the single adapter is loaded, only one of the detecting levers is swung by the single adapter, so that only one of the detecting switches outputs the detection signal. The control circuit utilizes the detection signals thus outputted to determine which has been loaded.

As is apparent from the above description, the conventional magazine disk player has a number of levers such as detecting levers and push-out levers which are used for detecting the loading of the magazine or single adapter or for removal of the latter, and a number of springs for urging those levers. That is, the conventional magazine disk player has a large number of components, which makes it difficult to miniaturize the magazine disk player and to reduce the manufacturing cost.

Figure 19:
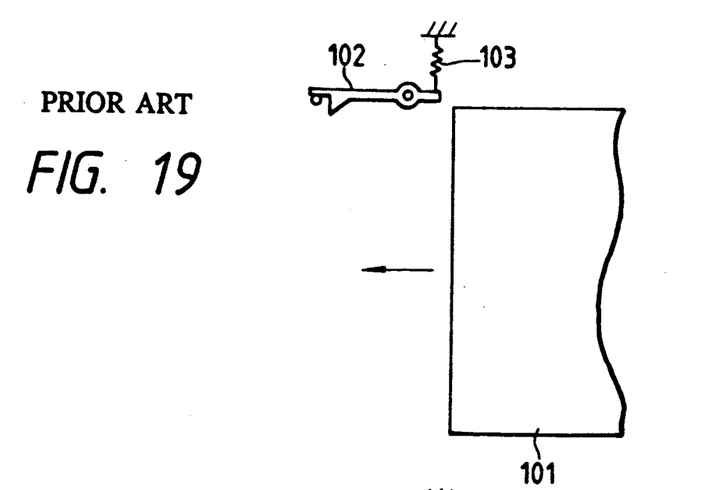
FIGS. 19, 20 and 21 are explanatory diagrams for a description of the operation of essential components in a conventional magazine disk player.
Figure 20:
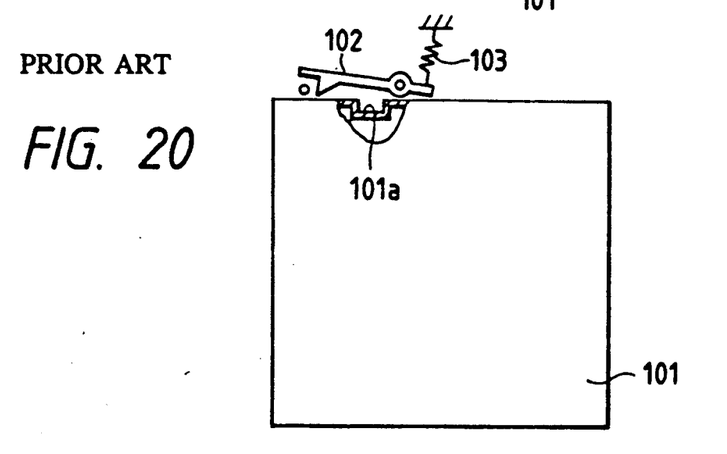
Figure 21:
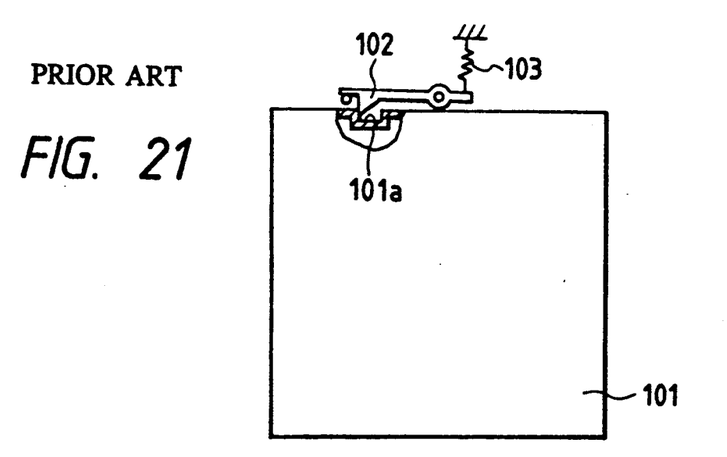

The conventional magazine disk player further includes magazine locking means for locking the magazine to the magazine loading section and another magazine loading detecting means for detecting the fact the magazine has been loaded in the magazine loading section and has been locked by the magazine locking means. The magazine locking means, as shown in FIGS. 19 and 20, comprises a locking member 102 which is provided near the magazine loading section in such a manner that it can freely swing, and which is engaged with a locking recess 101a formed in the side of the magazine 101 to lock the latter 101 to the magazine loading section, and urging means, namely, a spring member 103 which is adapted to urge the locking member 102 so that the latter 102 locks the magazine 101. Hence, as the magazine 101 is loaded into the magazine loading section, the locking member 102 is brought into slide contact with the side of the magazine by the elastic force of the spring member 103 and when the magazine 101 has been completely inserted into the magazine loading section, the locking member is engaged with the engaging recess 101a of the magazine 101. As for the magazine loading detecting means, a detecting switch (not shown) is provided which is operated when engaged with the engaging member 102. The detecting switch detects the fact that, as the magazine 101 is inserted into the magazine loading section, the locking member 102 is swung from the locking position shown in FIG. 19 to the non-locking position shown in FIG. 20, and thereafter it is returned to the locking position as shown in FIG. 21; that is, the magazine has been completely loaded in the magazine loading section.

In the conventional magazine disk player thus constructed, the detecting switch is operated by a single reciprocation of the locking member loading of the magazine, to detect the fact that the magazine has been loaded in the magazine loading section. Hence, when the operator suspends the insertion of the magazine 101 in the stage shown in FIG. 20, and pulls the magazine out of the magazine loading section, detection of the loading of the magazine is accomplished, because, in this case, the locking member makes a single reciprocation.

SUMMARY OF THE INVENTION

Accordingly, an object of this invention is to eliminate the above-described difficulties accompanying a conventional magazine disk player.

More specifically, an object of the invention is to provide a magazine disk player in which the loading of a magazine can be positively detected, and the number of components which are required for detecting the loading of the magazine and for ejecting the magazine are reduced.

A first specific feature of the invention resides in a magazine disk player which comprises a magazine loading section which detachably holds a magazine which retains disks in a housing which are freely inserted into or taken out of the housing, disk conveying means for taking a disk out of the housing and supplying the disk thus taken out to disk playing means, and returning the disk into the housing after the disk has been played, magazine loading detecting means for detecting the loading of the magazine into the magazine loading section, operating member which is provided in the deepest region of the magazine loading section in such a manner that the operating member is movable between a first position and a second position, and which, when the magazine is loaded into the magazine loading section, is moved from the first position to the second position being engaged with the magazine, a locking member which is provided near the magazine loading section in such a manner that the locking member is movable between a locking position and a non-locking position, and which is engaged with the magazine to lock the magazine to the magazine loading section, and urging means for urging the locking member towards the locking position, the magazine loading detecting means detecting the position of the locking member, the operating member being kept engaged with the locking member to inhibit the movement of the locking member while being moved from the first position to the second position, and the inhibition of the movement of the locking member is eliminated when the operating member reaches the second position.

That is, in the magazine disk player, the operating member, being pushed by the magazine which is being inserted into the magazine loading section, is engaged with the locking member until it reaches the second position, so that the locking of the magazine with the locking member, and the detection of the loading of the magazine due to the movement of the locking member are inhibited.

A second specific feature of the invention resides in a magazine disk player which comprises a magazine loading section which detachably holds a magazine which retains disks in a housing which are freely inserted into or taken out of the housing through an opening formed in the housing, disk conveying means for taking a disk out of the housing and supplying the disk thus taken out to disk playing means, and returning the disk into the housing after the disk has been played, magazine loading detecting means for detecting the loading of the magazine into the magazine loading section, push-out means which is provided in the deepest region of the magazine loading section in such a manner that the push-out means is movable between a push-out position and a non-push-out position, and which is engaged with the magazine to push the magazine out of the magazine loading section, and pushing force applying means for applying a pushing force to the push-out member, the magazine loading detecting means detecting the position of the push-out member. That is, in the magazine disk player, separately according to the positions of the push-out member adapted to push the magazine out of the magazine loading section, it is determined whether the magazine has been loaded or whether the single adapter has been loaded.

The nature, principle and utility of the invention will become more apparent from the following detailed description when read in conjunction with the accompanying drawings

DETAILED DESCRIPTION OF THE INVENTION

An example of a magazine disk player, which constitutes one embodiment of this invention, will be described with reference to the accompanying drawings.

Figure 1:
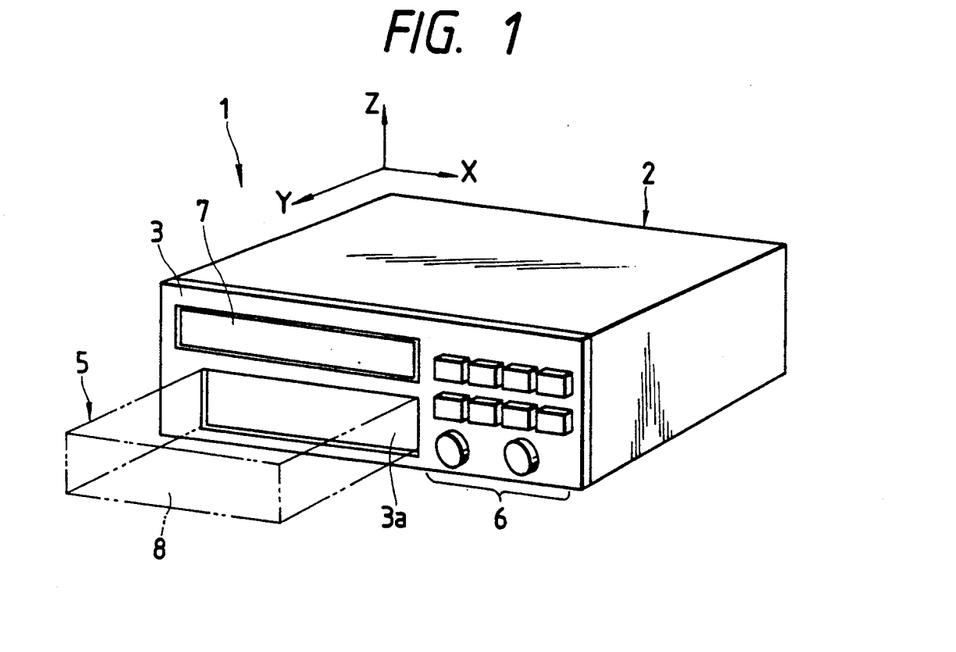
FIG. 1 is a perspective view showing the external appearance of a magazine disk player which constitutes one embodiment of this invention.

In FIG. 1, reference numeral 1 designates the magazine disk player according to the invention. As shown in FIG. 1, the magazine disk player has a player housing 2, in which a rectangular opening 3a is formed through which a magazine 5 is loaded into a magazine loading section inside the housing 2. The opening 3a is elongated in a horizontal direction. In this case, as shown in FIG. 1, the horizontal direction is the direction of the arrow X which is extended to the left of the housing, the lateral direction is the direction of the arrow Y which is extended towards the front of the housing and is perpendicular to the direction of the arrow X, and the direction of the arrow Z is the upward direction which is perpendicular to both of the directions of the arrows X and Y.

Figure 2:
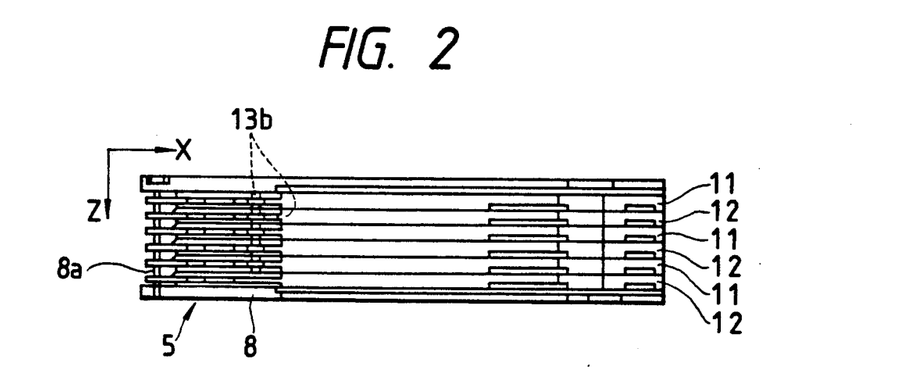
FIG. 2 is a front view of a magazine which is loaded in the magazine disk player shown in FIG. 1.
Figure 3:
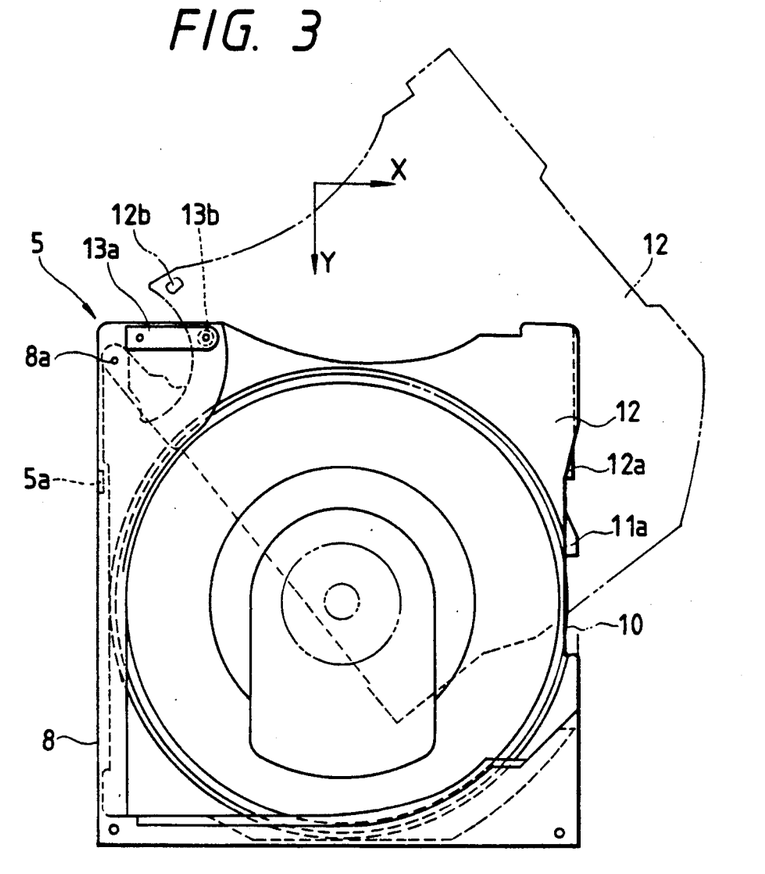
FIG. 3 is a sectional plan view of the magazine which is loaded in the magazine disk player shown in FIG. 1.

As shown in FIGS. 2 and 3, the magazine 5 comprises a substantially flat rectangular-parallelepiped-shaped housing 8, and three rectangular-plate-shaped trays 11 bearing disks 10 thereon respectively and three rectangular-plate-shaped trays 12 bearing disks 10 thereon respectively. The trays 11 and 12, and accordingly the disks 10 are stacked with a predetermined pitch vertically, or in a direction perpendicular to the disk bearing surface of the turn table provided in the player housing 2 (or in the direction of the arrow Z and in the direction opposite). The trays 11 and 12 are mounted in the housing in such a manner that they are rotatable around a rotation support shaft 8a which is provided in the housing 8 at the right rear corner. Thus, the trays can be swung in and out of the housing through an opening formed therein.

Figure 4:
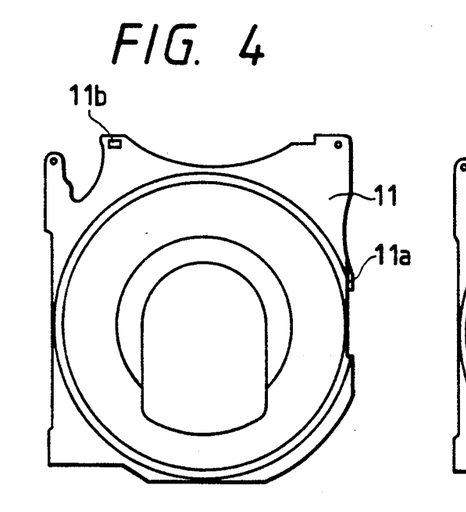
FIGS. 4 and 5 are plan views showing trays provided in the magazine shown in FIGS. 2 and 3.
Figure 5:
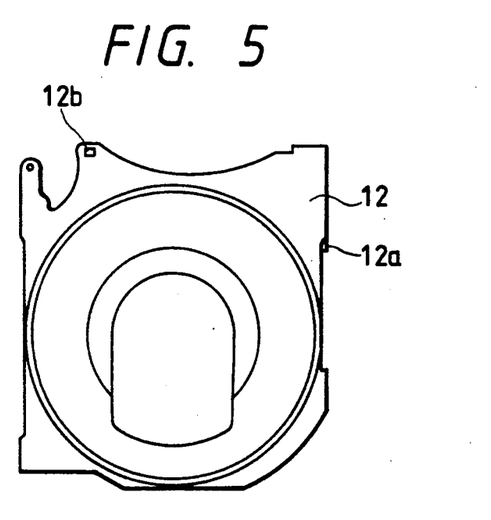

The trays 11 and 12 are shown in FIG. 4 and FIG. 5 in detail, respectively. As is seen from comparison of FIGS. 4 and 5, the trays 11 and 12 are substantially equal in configuration; however, their portions 11a and 12a on which the finger tip is placed when the operator pulls the tray out of the housing are different in configuration and position. The trays 11 and the trays 12 are arranged alternately. The housing 8 has leaf springs 13a near the rotation support shaft 8a, and five spherical members 13b which are arranged in the direction of arrangement of the trays, and are movable into openings 11b and 12b respectively formed in the trays. The diameter of the spherical members 13b is equal to the pitch of arrangement of the trays 11 and 12, and the leaf springs 13a provide bias forces in the direction of movement of the trays. The provision of the leaf springs 13a and the spherical members 13b is to prevent the difficulty that, when one tray has been projected out of the housing 8, the other trays are projected therefrom.

The magazine 5 is constructed in the same manner as that disclosed, for instance, in Japanese Kokai No. 206059/1990. Further provided in the player housing are playing means (not shown) which includes a turn table and a pickup for playing a disk, and a disk conveying means (not shown) which, in response to a playing instruction, takes the specified disk out of the magazine 5 and supplies it to the playing means, and after the playing operation has been accomplished, returns it into the magazine 5. The playing means and the disk conveying means are the same as those disclosed, for instance, by the aforementioned Japanese Kokai No. 206059/1990.

Figure 6:
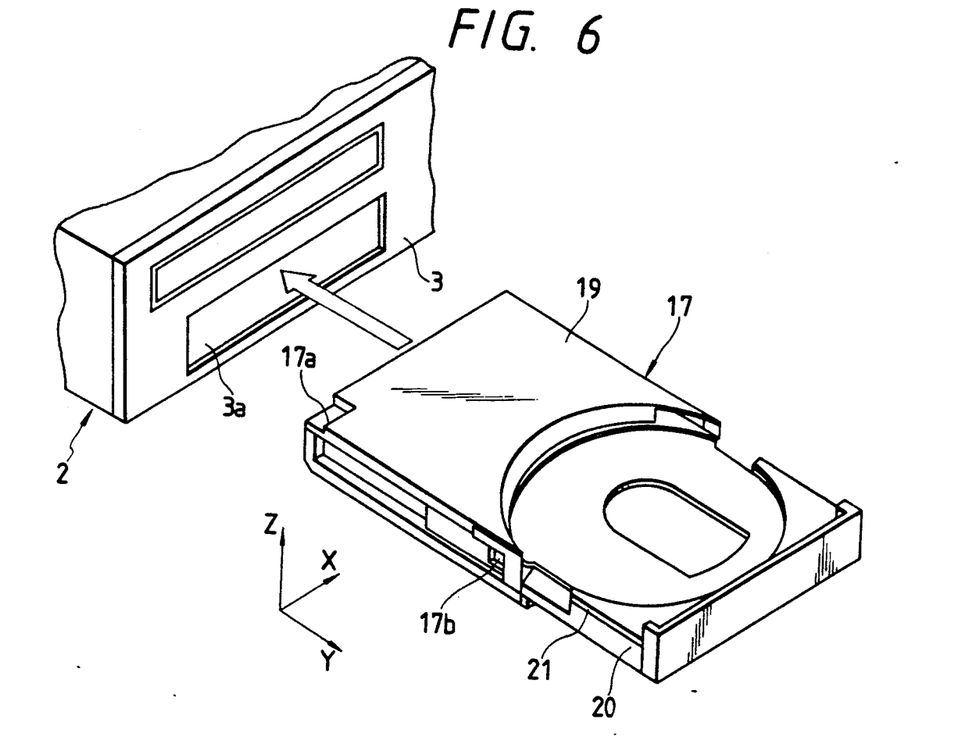
FIGS. 6 and 7 are perspective views of a single adapted which is to be loaded in the magazine disk player shown in FIG. 1.
Figure 7:
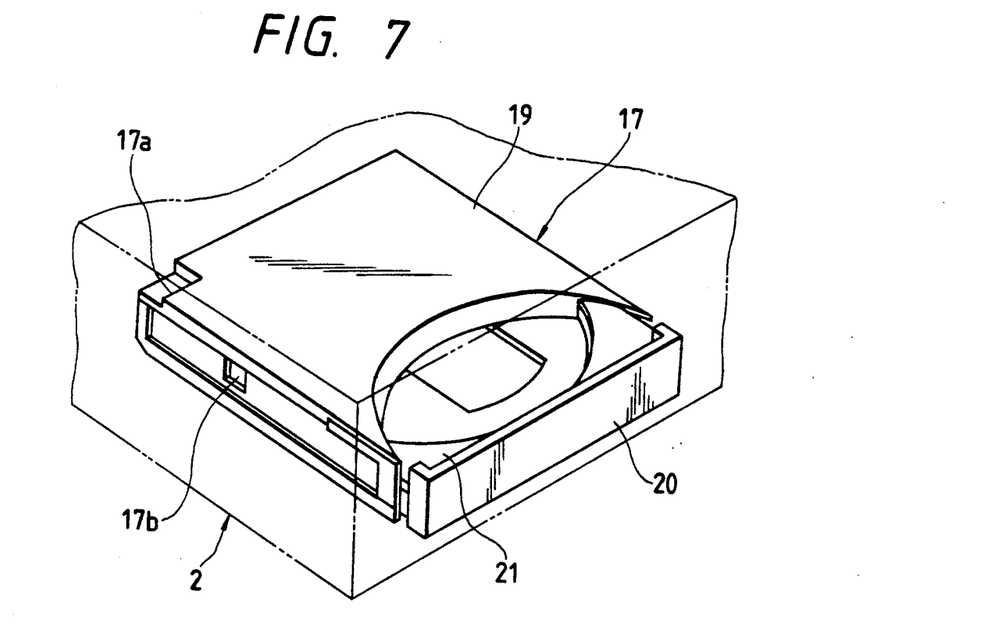
Figure 8:
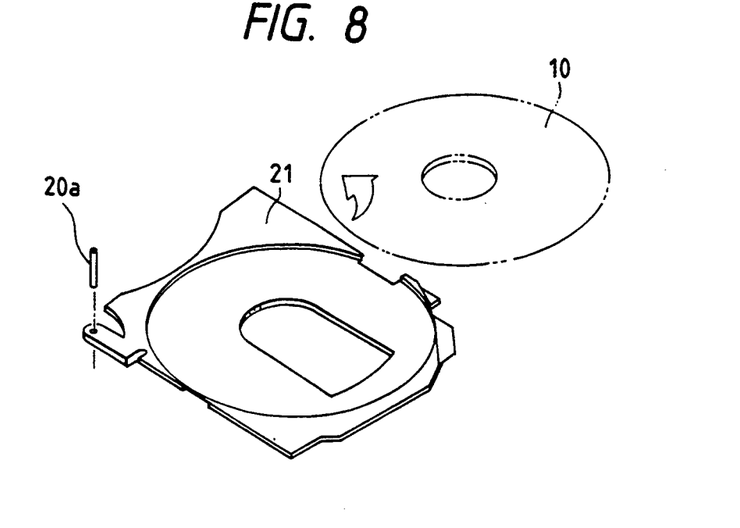
FIG. 8 is a perspective view showing a tray and a disk to be placed on the tray in the single adapter shown in FIGS. 6 and 7.

FIGS. 6, 7 and 8 show a single adapter 17 which is loaded in the magazine loading section in the player housing 2 similarly as in the case of the above-described magazine. The employment of the single adapter 17 is advantageous in that the loading of a disk to be played, and the replacing of a disk which has been played can be achieved quickly and readily. The single adapter 17 equal in outside dimension to the above-described magazine 5. The single adapter 17, as shown in FIGS. 6, 7 and 8, includes a casing 19 which is loaded directly in the magazine loading section through the opening 3a formed in the front panel 3 of the player housing 2, a movable accommodating member 20 which is provided in the housing 19 in such a manner that it is movable towards the magazine loading section, a single tray 21 which supports a disk 10 on its main surface, and which is rotatable about a rotation support shaft 20a in a plane parallel to the main surface, so that it is swung in and out of the movable accommodating member 20 and a coil spring (not shown) urging the movable accommodating member 20 so as to be pushed out of the casing 19. The single adapter is the same in construction as that disclosed, for instance, by Japanese Patent Application No. 261852/1986.

In the case where the above-described single adapter 17 is used instead of the magazine, the casing 19 is fixedly located in the magazine loading section, so that the movable accommodating member 20 is allowed to go in and out of the player housing 2 together with the tray 21 mounted on it, whereby the disk is loaded, unloaded or replaced.

Figure 9:
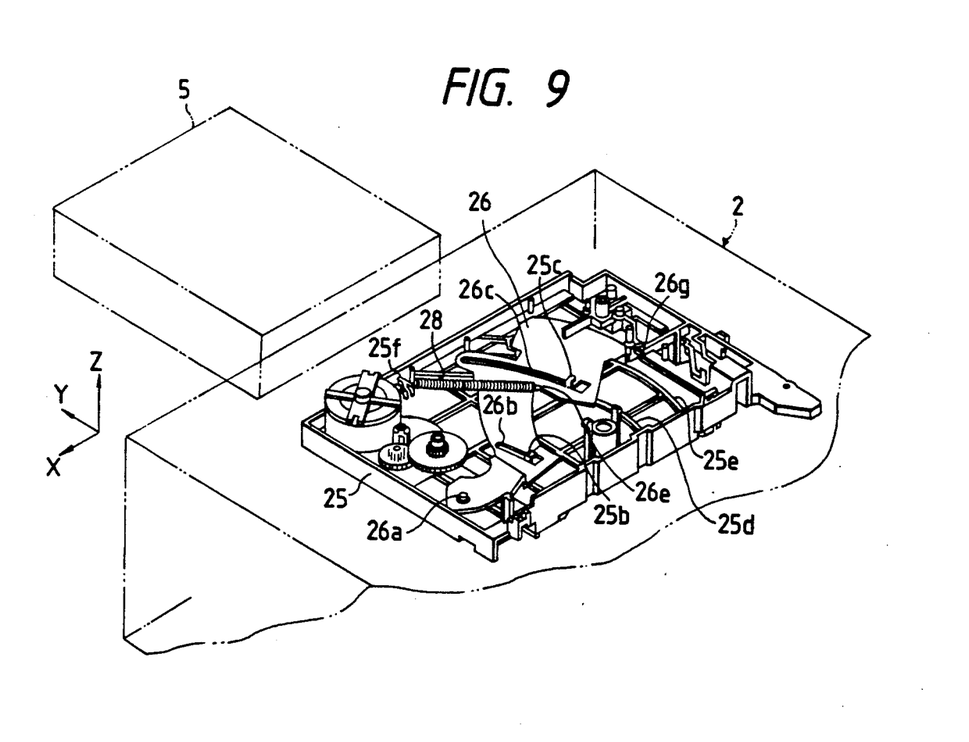
FIG. 9 is a perspective view showing the internal mechanism of the magazine disk player shown in FIG. 1.
Figure 10:
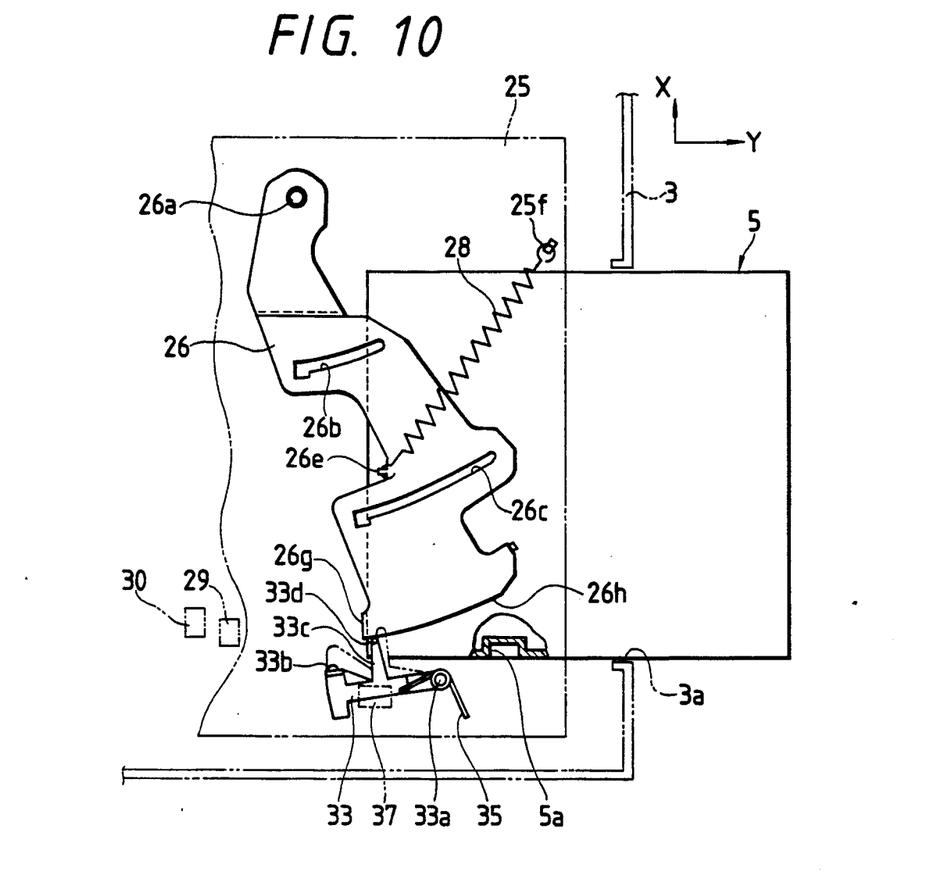
FIG. 10 is a plan view, with parts cut away, showing part of the internal mechanism of the magazine disk player shown in FIG. 1.
Figure 11:
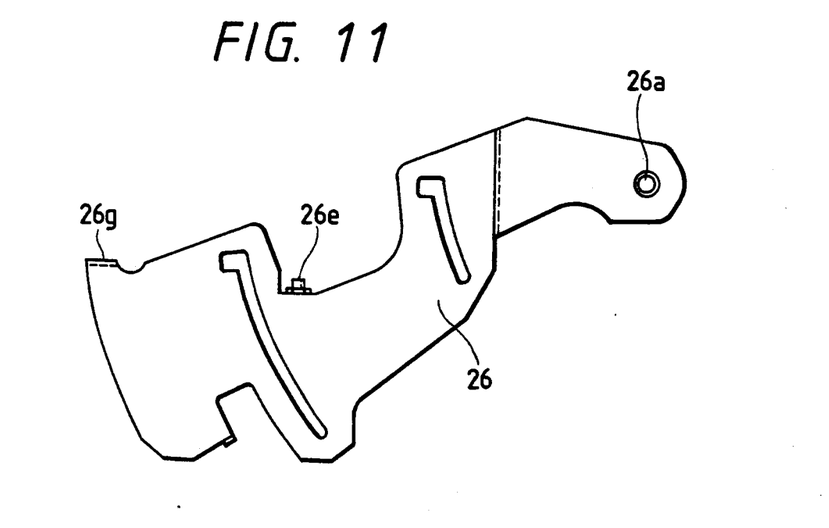
FIGS. 11 and 12 are a plan view and a front view showing a push-out lever in the internal mechanism shown in FIGS. 9 and 10.
Figure 12:
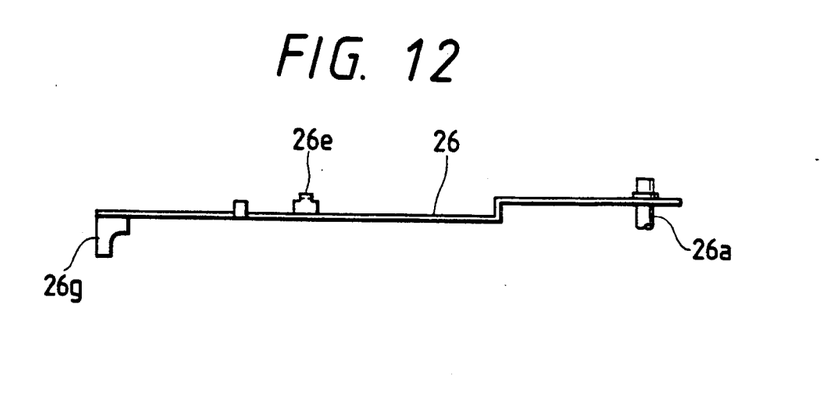
Figure 13:
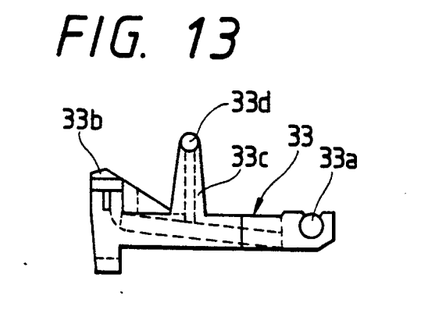
FIG. 13 is a plan view of a locking member in the internal mechanism shown in FIGS. 9 and 10.
Figure 14:
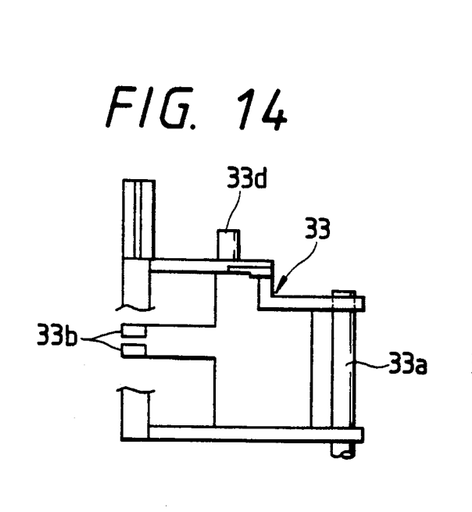
FIG. 14 is a front view, with parts cut away, showing the locking member.
Figure 15:
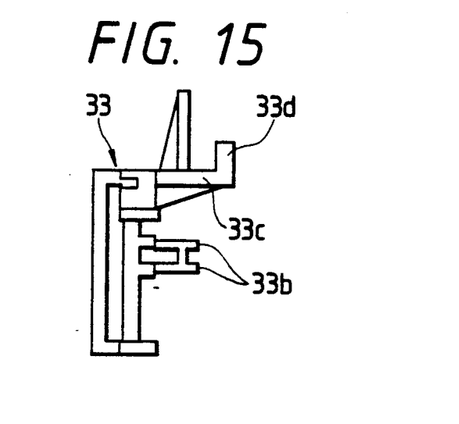
FIGS. 15 and 16 are a right side view and a rear view of the locking member.
Figure 16:
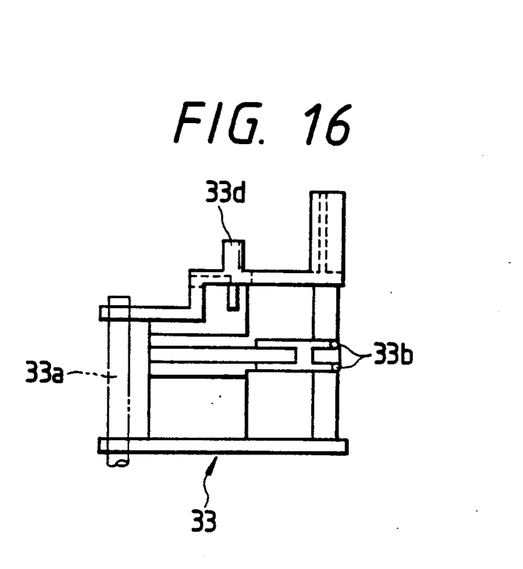

As shown in FIGS. 9 and 10, a substantially flat-plate-shaped chassis 25 is provided in the player housing 2 in such a manner that it is extended over the magazine loading section described above. A push-out lever 26 is provided above the chassis 25 and in the deepest portion of the magazine. The push-out lever 26 engages the magazine 5 or single adapter 17 loaded in the magazine loading section to push it out of the magazine loading section. One end portion of the push-out lever 26 is mounted on a support pin 26a in such a manner that the lever 26 is pivotable with respect to the chassis 25 about pin 26a. As is apparent from FIGS. 11 and 12, the push-out lever 26 is substantially in the form of a flat plate, and is disposed parallel with the chassis 25. Two elongated, arcuate guide slots 26b and 26c are formed in the push-out lever 26 in such a manner that the center of the radius of curvature for each of the slots is the support pin 26a. The guide slots 26b and 26c are slidably engaged with guide protrusions 25b and 25c which are extended from the chassis 25, respectively. Furthermore, as shown in FIG. 9, two arcuate slide protrusions 25d and 25e are extended from the upper surface of the chassis 25 in such a manner that they are in slide contact with the lower surface of the push-out lever 26.

A pushing force applying means, namely, a coil spring 28 is connected between a lug 26e formed at the free end portion of the push-out lever 26 and a protrusion 25f extended from the upper surface of the chassis 25, so as to apply a pushing force, or a biasing force, to the push-out lever.

As shown in FIGS. 9 through 12, the push-out lever 26 has an abutment portion 26g at the free end which is extended downwardly so as to abut against the magazine 5 or the single adapter 17. As is seen from FIG. 10, the abutment portion 26g abuts against the end face of the magazine which is confronted with the magazine loading section when the magazine is inserted into the latter (hereinafter referred to as "an insertion end face", when applicable). Therefore, as the magazine 5 is inserted into the magazine loading section, the push-out lever 26 is swung clockwise in FIG. 10, about the support pin 26a against the elastic force of the coil spring 28.

On the other hand, as shown in FIGS. 6 and 7, a recess 17a is formed in the end portion of the single adapter 17 which is confronted with the magazine loading section when it is inserted into the magazine loading section (hereinafter referred to as "an insertion end portion", when applicable). The abutment portion 26g of the push-out lever 26 is engaged with the recess 17a thus formed. That is, the position of the push-out lever 26 pivoted when the magazine 5 is loaded into the magazine loading section is different from that of the push-out lever 26 pivoted when the single adapter 17 is loaded thereinto. Hereinafter, the position of the push-out lever 26 as shown in FIG. 10 will be referred to as "a push-out position, or a first position", when applicable. In addition, the position to which the push-out lever 26 is moved from the push-out position by being pushed by the magazine 5 or the single adapter 17 will be referred to as "a non-push-out position, or a second position". That is, when the push-out lever 26 pushes the magazine 5 or the single adapter 17 out of the magazine loading section in response to an ejection instruction, the push-out lever is returned from the non-push-out position to the push-out position with the aid of the elastic force of the coil spring 28. As noted above, the non-push-out position of the inserted magazine 5 is different from that of the inserted single adapter 17.

As shown in FIG. 10, two detecting switches 29 and 30 are provided on the chassis 25 which engage with the push-out lever 26 which has reached the non-push-out position, to detect the arrival of the push-out lever 26 at the non-push-out position. The detection signals outputted by the detecting switches 29 and 30 are applied to a control circuit (not shown). Separately according to the detection signals, the control circuit determines that the magazine 5 and the single adapter 17 have been loaded (described in detail later); that is, the control circuit determines which of the magazine and single adapter has been loaded. In other words, according to the different positions of the push-out lever 26 adapted to push the magazine or the single adapter out of the magazine loading section, it is discriminated whether the magazine or the signal adapter has been inserted. Hence, in the magazine disk player of the invention, unlike the conventional magazine disk player, it is unnecessary to use the special lever member for discrimination only and the coil spring urging the lever member, whereby the player can be miniaturized as much and the manufacturing cost can be reduced as much. When the single adapter 17 is loaded in the magazine loading section, only the detecting switch 29 is engaged with the push-out-lever 26 to output the detection signal; whereas when the magazine 5 is loaded therein, both of the detecting switches 29 and 30 are engaged with the push-out-lever 26 to output the detection signals.

As shown in FIG. 10, a locking member 33 is provided near the magazine loading section in such a manner that it extends substantially in the front-to-rear direction. The locking member 33 is used to lock the magazine 5 with respect to the magazine loading section. The locking member 33 is shown in FIGS. 13 through 16 in more detail.

The front end portion of the locking member 33 is mounted on a support pin 33a on the lower surface of the chassis 25 in such a manner that the locking member 33 is pivotable about the support pin 33a. As is more apparent from FIGS. 13 through 16, the locking member 33 has locking pawls 33b at the free end which are engageable with the magazine 5 and the single adapter 17. On the other hand, as shown in FIGS. 3, 6 and 7, recesses 5a and 17b are respectively formed in the sides of the magazine 5 and the single adapter 17 so that they are engaged with the locking pawls 33b. More specifically, the recess 5a is formed in the side of the housing 8 of the magazine 5, while the recess 17a is formed in the side of the movable accommodating member 20 of the single adapter 17.

The locking member 33 has an elongation 33c which is extended from its middle portion to the left (in the direction of the arrow X), and a cylindrical part 33d is formed at the end of the elongation 33c. On the other hand, as shown in FIG. 10, the push-out lever 26 has an arcuate cam surface 26h at the free end. The Center of the radius of curvature of the cam surface 26h is the swing center of the push-out lever 26, so that the cylindrical part 33d of the locking member is held in slide contact with the arcuate cam surface 26h while the push-out lever 26 is moved from the first position, or the push-out position, to the second position, or the non-push-out position. That is, the cylindrical part is disengaged from the cam surface when the push-out lever 26 reaches the second position. The locking member 33 can be swung between the locking position as indicated by the two-dot chain line in FIG. 10 where the magazine 5 or the signal adapter 17 is locked, and the non-locking position as indicated by the solid line where the magazine or the single adapter is unlocked. Urging means, namely, a spring member 35 is mounted on the support pin 33a supporting the locking member 3, so as to urge the locking member towards the locking position. The locking member 33 and the spring member 35 form locking means for locking the magazine 5 or the single adapter 17 to the magazine loading section.

As is seen from the condition of contact of the arcuate cam surface 26h of the push-out lever 26 with the cylindrical part 33c of the locking member, while the push-out lever 26 is moved from the push-out position to the non-push-out position the push-up lever is held in contact with the locking member 33 so that the swinging of the locking member from the non-locking position to the locking position is inhibited, and when the push-out lever 26 reaches the non-push-out position, the inhibition is eliminated, so that the locking member 33 is swung to the locking position, so as to lock the magazine 5 or the single adapter 17 to the magazine loading section.

As shown in FIG. 10, a detecting switch 37 is mounted on the chassis 25 in such a manner that it is positioned near the free end of the locking member 3 so that it is operated by the locking member 33. The detecting switch 37 is a normally closed switch which is to detect the fact that the magazine 5 or the single adapter 17 has been loaded in the magazine loading section and locked to the latter with the locking member 33. That is, when the locking member 33 is at the non-locking position as indicated by the solid line in FIG. 10, the detecting switch 37 is opened with its armature pushed by the locking member 33; and when the locking member 33 is at the locking position as indicated by the two-dot chain line, the locking remember 33 is disengaged from the armature of the detecting switch; that is, the switch 37 is opened.

Now, an operation of loading the magazine 5 or the single adapter 17 into the magazine loading section in the magazine disk player thus constructed, and an operation of unloading, or ejecting, the magazine 5 of the single adapter 17 will be described.

Figure 17:
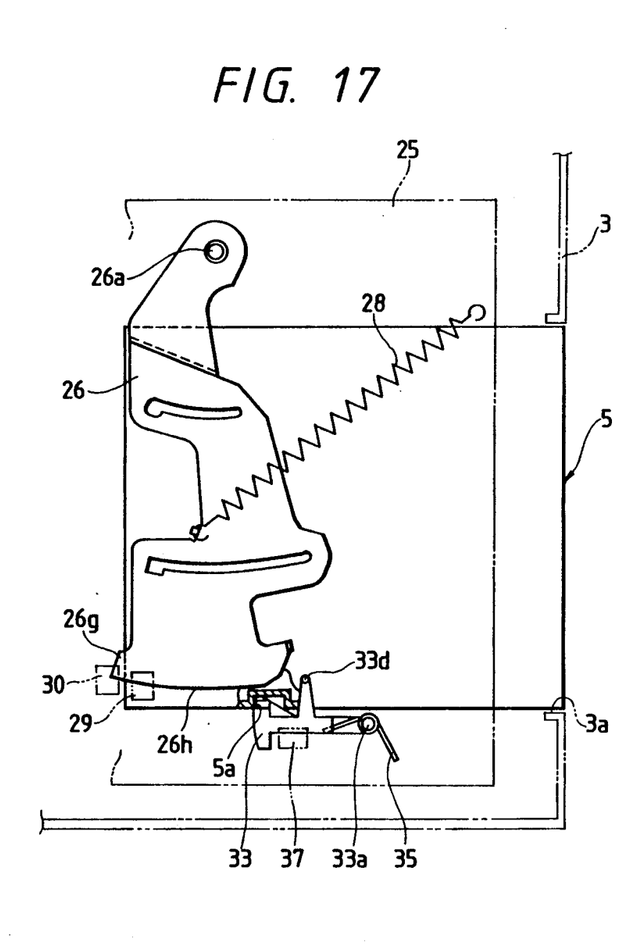
FIGS. 17 and 18 are explanatory diagrams for a description of the operation of the internal mechanism shown in FIGS. 9 and 10.

First, an operation of loading the magazine 5, and an operation of unloading (or ejecting) the same will be described. Before the magazine 5 is loaded, the push-out lever 26, as shown in FIG. 10, is held at the push-out position, or the first position, being urged by the coil spring 28, while the locking member 33 is held at the locking position as indicated by the two-dot chain line being urged by the spring member 35. As the magazine 5 is inserted, the insertion end face of the magazine is abutted against the abutment portion 26g of the push-out lever 26, so that the push-out lever 26 is turned clockwise in FIG. 10. Until the push-out lever 26 is moved to the non-push-out position, or the second position, shown in FIG. 17, the arcuate cam surface 26h of the push-out lever 26 is in slide contact with the cylindrical part 33d of the locking member 33, thus inhibiting the clockwise rotation of the locking member 33. When the magazine 5 reaches a predetermined position; that is, when the push-out lever 26 is positioned as shown in FIG. 17, the inhibition of the swinging of the locking member 33 by the push-out lever 26 is eliminated, so that the locking member 33 is swung to the locking position by the elastic force of the spring member 35 as shown in FIG. 17. As a result, the engaging pawl 33b of the locking member 33 is engaged with the recess 5a formed in the side of the magazine 5; that is, the latter 5 is locked in the magazine loading section.

While the push-out lever 26 is swung in the above-described manner, it is engaged with both of the detecting switches 19 and 30 to activate them. Thus, the control circuit confirms that the magazine 5 has been loaded. When the locking member 33 is swung from the non-locking position to the locking position, the detecting switch 37 is closed. Thus, it is confirmed that the magazine 5 has been loaded, and has been locked with the locking member.

The operation of ejecting the magazine is started by pushing an eject button which is one of the group of operating buttons. When the eject button is pushed, a mechanism (not shown) is activated, so that the locking member 33 is returned from the locking position shown in FIG. 17 to the non-locking position shown in FIG. 10. As a result, the push-out lever 26 is returned to the push-out position from the non-push-out position by the elastic force of the coil spring 28, so that the magazine 5 is removed from the magazine loading section. At the same time, the push-out lever 26 is disengaged from the detecting switches 29 and 30, while the detecting switch 37 is opened by the locking member 33. Thus, the ejection of the magazine 5 has been accomplished.

Now, an operation of loading the single adapter 17 into the magazine loading section, and an operation of unloading (or ejecting) it therefrom will be briefly described, because they are substantially the same as the operation of loading the magazine 5 and the operation of unloading it.

Figure 18:
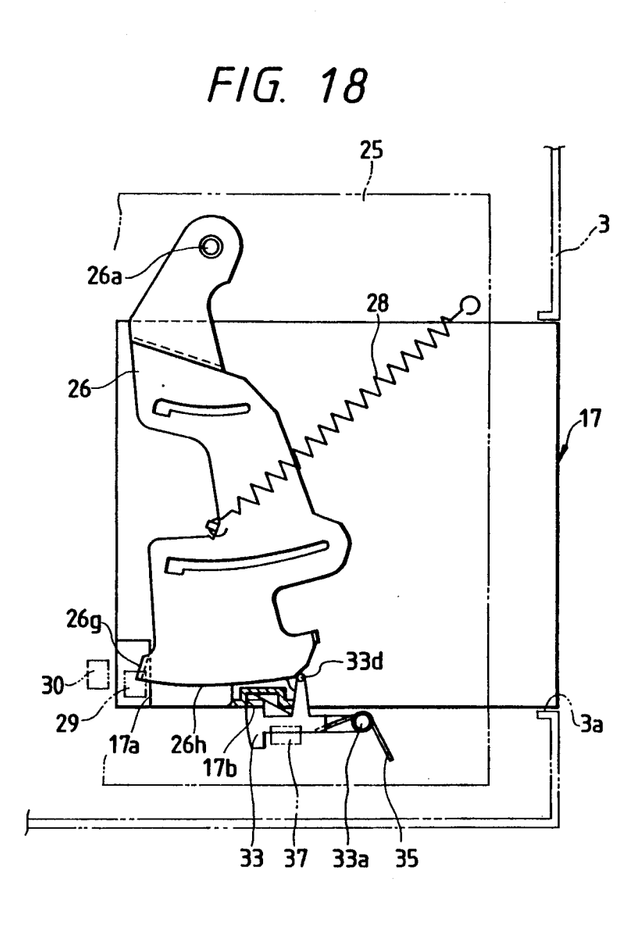

When the single adapter 17 is loaded, as shown in FIG. 18 the abutment portion 26g of the push-out lever 26 is engaged with the recess 17a formed in the insertion end face of the single adapter 17. Accordingly, the amount of swing of the push-out lever 26 is smaller than in the loading of the magazine 5, and the only the detecting switch 29 is operated. From the operation of the detecting switch 29, the control circuit confirms that, instead of the magazine 5, the single adapter 17 has been loaded. Similarly as in the loading of the magazine 5, when the push-out lever 26 reaches the non-push-out position, the cylindrical part 33d of the locking member 33 is disengaged from the arcuate cam surface 26h of the push-out lever, so that the locking member 33 is swung to engage with the recess 17b formed in the side of the single adapter 17. Thus, the single adapter 17 has been locked to the magazine loading section. Simultaneously, the detecting switch 37 is closed. Thus, the control circuit confirms from the closure of the detecting switch 37 that the single adapter 17 has been locked to the magazine loading section. The single adapter 17 is ejected in the same way as the magazine 5.

In the above-described embodiment, the magazine ejection push-out lever 26 is employed as the operating member which is provided near the deepest region of the magazine loading section in such a manner that it is movable between the first position and the second position, and, when the magazine is loaded into the magazine loading position, it is moved from the first position to the second position by being pushed by the magazine; however, the invention is not limited thereto or thereby. That is, the operating member may be provided in addition to the push-out lever 26.

As was described above, the magazine disk player according to the invention comprises the operating member which is provided in the deepest region of the magazine loading section in such a manner that it is movable between the first position and the second position, and, which, when the magazine is loaded into the magazine loading section, is moved from the first position to the second position being engaged with the magazine, the locking member which is provided near the magazine loading section in such a manner that it is movable between the locking position and the non-locking position, and which is engaged with the magazine to lock the latter to the magazine loading section, the urging means for urging the locking member towards the locking position and the magazine loading detecting means which detects the position of the locking member to determine that the magazine has been completely loaded in the magazine loading section and locked to the latter with the locking member. In the magazine disk player thus constructed, while the operating member, being pushed by the magazine inserted into the magazine loading section, is moved from the first position to the second position, the operating member is engaged with the locking member, thus inhibiting the movement of the locking member to the locking position, and when the operating member reaches the second position, the inhibition of the movement of the locking member to the locking position is eliminated, and the magazine loading detecting means is activated.

Owing to this construction of the magazine disk player, before the loading of the magazine is accomplished, it will never be determined that the magazine has been completely loaded; &hat is, the loading can be positively detected. Accordingly, for instance the difficulty can be positively eliminated that the disk conveying means is operated although the magazine is not completely loaded.

Furthermore, the magazine disk player of the invention comprises the magazine loading detecting means for detecting the fact that the magazine has been loaded, the push-out member which is provided near the deepest region of the magazine loading section in such a manner that it is movable between the push-out position and the non-push-out position, and which is engaged with the magazine to push the magazine out of the magazine loading section, and the urging force applying means for applying the pushing force to the push-out member, the magazine loading detecting means being adapted to detect the position of the push-out member.

In the magazine disk player thus designed, the position where the push-out member is located when the magazine containing a plurality of disk is loaded is different from the position where the push-out member is located when the single adapter containing one disk. Therefore, it can be determined according to the two different positions whether the magazine has been loaded or whether the single adapter has been loaded. That is, the determination can be made without a particular lever member or a coil spring for urging the lever member. Thus, the player can be miniaturized and can be reduced in manufacturing cost.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magazine disk player, comprising:
   a housing;
   a disk playing means for playing a disk;
   a magazine loading section disposed in said housing for detachably holding a magazine accommodating a plurality of disks therein, said magazine being insertable into said housing and retrievable therefrom;
   disk conveying means for taking a disk out of said magazine and supplying said disk to said disk playing means, and for returning said disk into said magazine after said disk has been played;
   an operating member disposed in said magazine loading section in such a manner that said Operating member is movable between a first position and a second position, and which, when said magazine is loaded into said magazine loading section, is moved from said first position to said second position in engagement with said magazine;
   a locking member disposed near said magazine loading section in such a manner that said locking member is movable between a locking position and a non-locking position, and which is engaged with said magazine to lock said magazine to said magazine loading section when said operating member is disposed in said second position;
   urging means for urging said locking member towards said locking position; and
   magazine loading detecting means for detecting the loading of said magazine into said magazine loading section, said magazine loading detecting means detecting the position of said locking member wherein said operating member is maintained in engagement with said locking member to inhibit the movement of said locking member while being moved from said first position to said second position, and the inhibition of the movement of said locking member is eliminated when said operating member reaches said second position.

2. A magazine disk player, comprising:
   a housing;
   a disk playing means for playing a disk;
   a magazine loading section disposed in said housing for detachably holding a magazine accommodating a plurality of disks therein, said magazine being insertable into said housing and retrievable therefrom;
   disk conveying means for taking a disk out of aid magazine and supplying said disk thus taken out to disk playing means, and returning said disk into said magazine after said disk has been played;
   detecting means for detecting a type of object loaded into said magazine loading section;
   push-out means disposed in said magazine loading section for urging said magazine from said housing, said push-out means being movable between a push-out position in which said magazine is pushed out of said magazine loading section and a non-push-out position where said magazine is disposed within said magazine loading section;
   pushing force applying means for applying a pushing force to said push-out means wherein said detecting means detects the position of said push-out means.

3. The magazine disk player of claim 2, wherein said magazine loading section is adapted to hold one of said magazines and an adapter which perform different functions, and wherein said push-out means assumes different non-push-out positions depending upon whether said magazine or said adaptor is loaded in said magazine loading section, said disk player further comprising means for discriminating the function based on the non-push-out position of said push-out means.

4. A magazine disk player, comprising:
   a housing;
   a disk playing means for playing a disk;
   a loading section, disposed in said housing, for detachably holding one a magazine and a single adaptor insertable into said housing and retrievable therefrom, said magazine accommodating a plurality of disks therein and said single adapter being adapted to supply a single disk to said loading section;
   disk conveying means for taking a disk out of said one magazine or adaptor for supplying said disk to said disk playing means, and for returning said disk into said one magazine or adaptor after said disk has been played;
   an operating member disposed in said magazine loading section in such a manner that said operating member is movable between a first, second and third positions, and which, when said one magazine or adaptor is loaded into said loading section, si moved from said first position to the second or third position in engagement with said one magazine and adaptor depending on whether said magazine or said adaptor has been loaded;
   means for urging said operating member toward said first position; and
   means for distinguishing which of said magazine or said adaptor has been loaded into said loading section by determining whether said operating member is in said second or third position.

5. The disk player of claim 4, further comprising a locking member for locking said magazine or said adaptor in said second or third position.

6. The disk player of claim 5 wherein said locking member is movable between a locking position and an non-locking position, and is engaged with said magazine or said adaptor when said operating member is disposed in said second or third position.

7. A magazine disk player, comprising:
   a housing;
   a disk playing means for playing a disk;
   a loading section, disposed in said housing, for detachably holding one of a magazine and a single adaptor insertable into said housing and retrievable therefrom, said magazine accommodating a plurality of disks therein and said single adaptor being adapted to supply a single disk to said loading section;

disk conveying means for taking a disk out of said one magazine or adaptor for supplying said disk to said disk playing means, and for returning said disk into said one magazine or adaptor after said disk has been played;

an operating member disposed in said magazine loading section in such a manner that said operating member is movable between a first, second and third positions, and which, when said one magazine or adaptor is loaded into said loading section, is moved from said first position to the second or third position in engagement with said one magazine and adaptor depending on whether said magazine or said adaptor has been loaded;

means for urging said operating member toward said first position; and means for distinguishing which of said magazine or said adaptor has been load into said loading section by determining whether said operating member is in said second or third position, wherein said operating member comprises a plate pivotally disposed in said housing and having an abutment portion extending therefrom, said one magazine and adaptor abutting against said plate when inserted into said housing so as to pivot said plate from said first position to said second or third position.

8. The disk player of claim 7 wherein said adaptor includes a recess at a position where said adaptor abuts said plate such that when said adaptor is completely inserted into said housing, said plate is not caused to pivot the same amount as when said magazine is completely inserted into said housing.

9. A magazine disk player, comprising:

a housing;

a disk playing means for playing a disk;

a loading section, disposed in said housing, for detachably holding one a magazine and a single adaptor insertable into said housing and retrievable therefrom, said magazine accommodating a plurality of disks therein and said single adapter being adapted to supply a single disk to said loading section;

disk conveying means for taking a disk out of said one magazine or adaptor for supplying said disk to said disk playing means, and for returning said disk into said one magazine or adaptor after said disk has been played;

an operating member disposed in said magazine loading section in such a manner that said operating member is movable between a first, second and third positions, and which, when said one magazine or adaptor is loaded into said loading section, is moved from said first position to the second or third position in engagement with said one magazine and adaptor depending on whether said magazine or said adaptor has been loaded;

means for urging said operating member toward said first position;

means for distinguishing which of said magazine or said adaptor has been loaded into said loading section by determining whether said operating member is in said second or third position;

a locking member for locking said magazine or said adaptor in said second or third position, said locking member being movable between a locking position and a non-locking position, and being engaged with said magazine or said adaptor when said operating member is disposed in said second or third position; and loading detection means for detecting the loading of said magazine or said adaptor into said housing.

10. The disk player of claim 9 wherein said housing detecting means detects the position of said locking member wherein said operating member is maintained in engagement with said locking member to inhibit the movement of said locking member while being moved from said first position to said second or third position, and the inhibition of the movement of said locking member is eliminated when said operating member reaches said second or third position.

* * * * *